Aug. 22, 1961 CHIYOICHI ANDO 2,997,544

APPARATUS FOR ANNOUNCING TO A CALLER A CONNECTION WITH THE PARTY CALLED PRIOR TO THE CALLER'S SPEAKING INTO THE TELEPHONE

Filed April 26, 1957 3 Sheets-Sheet 1

INVENTOR

CHIYOICHI ANDO

BY

Mead, Browne, Schuyler & Beveridge

ATTORNEYS

APPARATUS FOR ANNOUNCING TO A CALLER A CONNECTION WITH THE PARTY CALLED PRIOR TO THE CALLER'S SPEAKING INTO THE TELEPHONE

Filed April 26, 1957

INVENTOR

CHIYOICHI ANDO

BY

Mead, Browne, Schuyler & Beveridge

ATTORNEYS

INVENTOR
CHIYOICHI ANDO
BY
Mead, Browne, Schuyler & Beveridge
ATTORNEYS 2,997,544
Patented Aug. 22, 1961

2,997,544

APPARATUS FOR ANNOUNCING TO A CALLER A CONNECTION WITH THE PARTY CALLED PRIOR TO THE CALLER'S SPEAKING INTO THE TELEPHONE

Chiyoichi Ando, 94 Sanya-cho, Meguro-ku, Tokyo, Japan

Filed Apr. 26, 1957, Ser. No. 655,251
Claims priority, application Japan May 14, 1956
8 Claims. (Cl. 179—1)

The invention relates to an apparatus for announcing to a caller a connection with the party called prior to the caller's speaking into the telephone, in which a mechanical device lifts up, when actuated, a telephone receiver at rest, so that there automatically comes into action both the telephone and an electrical device which latter device catches and magnifies incoming sounds or voices in response to such lifting of the receiver and ceases to act upon removing the lifted receiver or upon replacing and lowering it to its original position.

The object is to actuate at one time, merely by means of a handle, knob, lever or the like, both mechanical and electrical devices with which a telephone is equipped, and to cause the electrical device to catch and magnify incoming sounds thereby announcing loudly to the caller prior to his speaking, the engagement of a line with a party whose telephone number has been dialed, or the failure so to engage.

According to the invention, since all the signal sounds and speaking voices are clearly heard as they sound, after a telephone number has been dialed, it is not necessary to wait holding the receiver to the ear until the other party comes to his telephone, or especially if the connection need not be kept secret. Consequently, one may attend to any other business until the other party who in the course of the conversation may have left the telephone for a while, returns and begins again to talk. When the conversation is completed, both the telephone and the apparatus in accordance with the invention may be put out of action merely by replacing the receiver on the lifter and rather strongly pressing down the receiver.

All these advantages will save unnecessary labor and increase the efficiency of business.

Further objects and advantages of the invention will become apparent from the following description taken in conjunction with the accompanying drawings.

In the accompanying drawings.

Figures 1, 2:
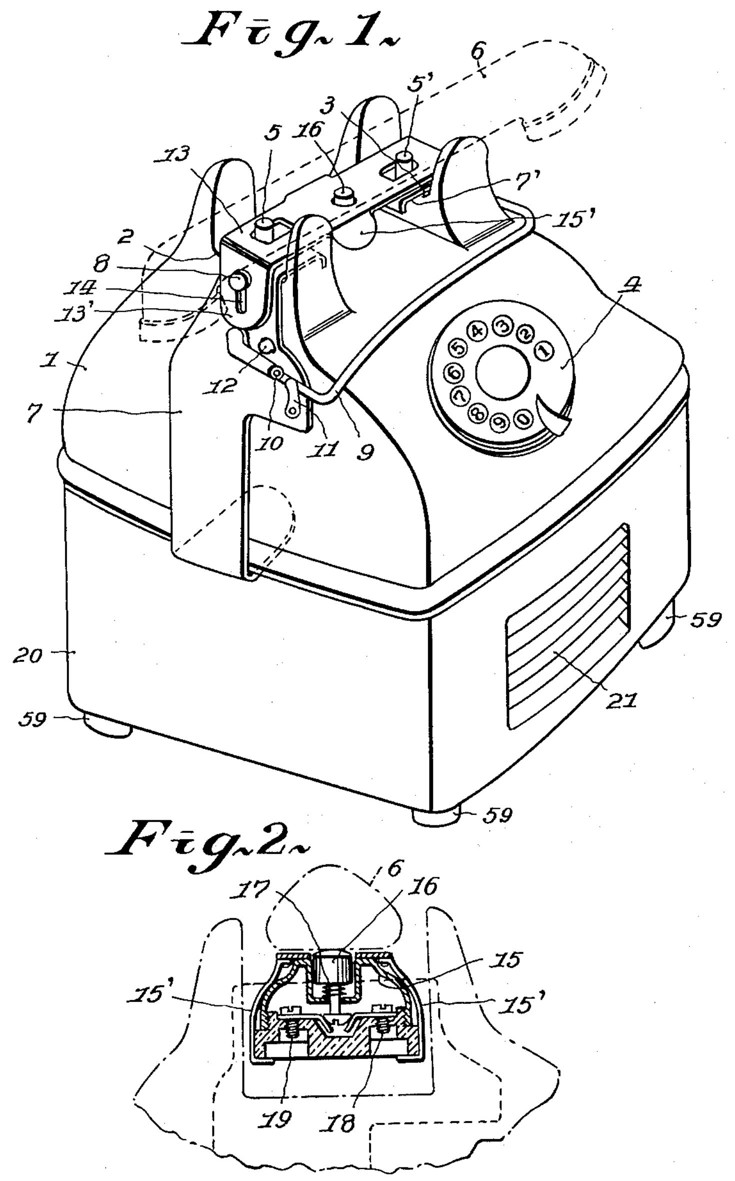
FIG. 1 is a perspective view of a conventional desk set telephone equipped with an apparatus in accordance with the invention.
FIG. 2 is a side view in vertical section of the mechanical device.

Referring now to the drawings and more particularly to FIGS. 1 and 2, an inverted U-shaped lifter 13, which has turn-down portions 13′ and 13″ (13″ is not shown) at both its ends for fitting, is mounted over and between two C-shaped fixtures 7 and 7′ which grip the case 1 of a conventional desk set telephone around the base of the case 1 and two supports 2 and 3 protruding from the head of the case 1, for the receiver with a transmitter, the so-called microtelephone or handset 6. A pin 8 with a head loosely passing through a slot 14 provided on each of the turn-down portions 13′ and 13″ is screwed into a side of each of the fixtures 7 and 7′, so that the lifter 13 may slide up and down on the side surfaces of the fixtures 7 and 7′. Two telephone switch-buttons 5 and 5′ respectively pass loosely upward through two holes of the lifter 13, through the middle of which loosely passes the button 16, which is constantly being pushed outward by a spring 17, of a switch 15 attached to the back of the lifter 13 by means of a retainer 15′.

A U-shaped handle 9 around the front portion of the head of the case 1 is pivoted by pins 10 and 10′ (10′ is not shown) on the sides of the fixtures 7 and 7′, and both ends of the handle 9 respectively contact the lower edges of the turn-down portions 13′ and 13″. On a side surface of the fixture 7 are provided an elastic clamp 11, which can keep the handle 9 in any position, and a switch with a button 12 which passes through a side of the fixture 7 and is pushed in on contacting a part of the handle 9. The switch with button 12 may be of similar construction to the switch 15 shown in FIG. 2.

A desk set telephone with a dial 4 rests on a cabinet 20 with a loud speaking aperture 21, which contains an electrical device for catching and magnifying incoming sounds and voices, and is electrically related by means of the switches 12 and 15 to a mechanical device for lifting up of the microtelephone or handset 6.

Figure 8:
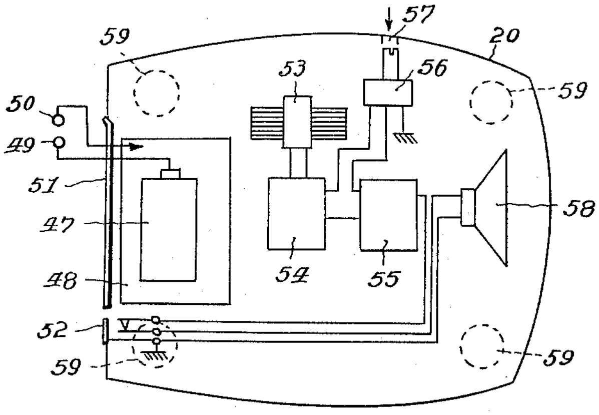
FIG. 8 is a diagrammatic plan view of an electrical device.

One terminal in the switch 12 is connected with a terminal 49 shown in FIG. 8, the other terminal in the same switch 12 with either one of terminals 18 or 19 in the switch 15, and the other terminal in the same switch 15 with a terminal 50 shown in FIG. 8.

Referring to FIG. 8, an A-battery 47, a B-battery 48, terminals 49 and 50, a jack for extracting signals 52, a pick-up or microphone 53, amplifiers 54 and 55, a semi-fixed volume regulator 56, and a loud speaker 58 are arranged in a cabinet 20 which has rests 59, a door 51 for exchange of batteries 47 and 48, and an aperture 57 for adjustment of the semi-fixed volume regulator 56.

Referring to FIGS. 1, 2 and 8, when a handle 9 is slightly pressed down in front by the tip of a finger or the like, the handle 9 swings using a pin 10 as a fulcrum so that the rear end of the handle 9 rises and raises the turn-down portions 13′ and 13″ thereby lifting up a lifter 13 on which a microtelephone or handset 6 is at rest and releasing the telephone switch-buttons 5 and 5′ which have been pressed down by the microtelephone or handset 6.

As the handle 9 is kept at any position to which it is swung by an elastic clamp 11, the lifter 13 remains at the lifted position and the telephone is put in action.

Then the swung handle 9 presses down the button of the switch 12 by the portion contacting the side surface of the fixture 7 thereby switching on the switch 12 while another switch is constantly switched on independently of the position of the lifter 13, because the button 16 of the switch 15 is pressed down by the microtelephone or handset 6 during mounting of the microtelephone or handset 6 on the lifter 13.

Therefore, when a number is dialed on a telephone thus put into action, a telephone call can be made and the signal sound of connection or failure of connection and the voice of a person called can be heard in an undertone through the receiver in the microtelephone or handset 6, but, as the switches 15 and 12 are already switched on, the electric device contained in the cabinet 20 under the telephone is in action, so as to catch by a pick-up or microphone 53 and magnify electrically by amplifiers 54 and 55 the above-mentioned sounds or voices which are finally announced loudly through a loud speaker 58.

Consequently, after finding that the called person is at his telephone, one may bring the receiver 6 to the ear removing it from the lifter 13 and can talk as on an ordinary telephone.

When the receiver 6 (microtelephone or handset) is removed from the lifter 13, the switch-button 16 is released and the switch 15 is switched off so that the electric device is inactive.

Figure 3:
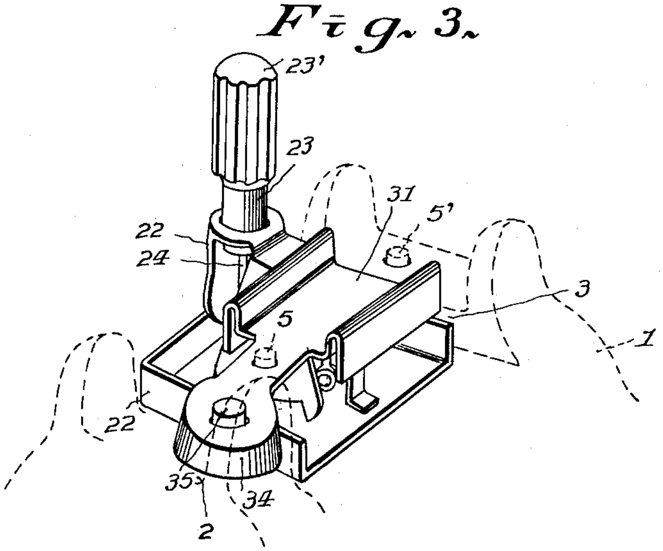
FIG. 3 is a perspective view of a modification of the mechanical device.
Figures 4, 5:
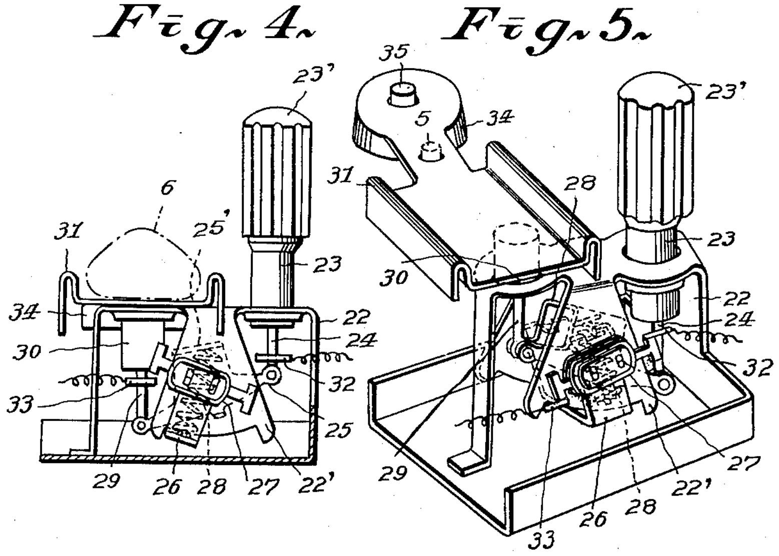
FIG. 4 is a side view partly in section of the same modification.
FIG. 5 is a slightly enlarged perspective view from an angle different from that in FIG. 3 of the same modification.

Referring to FIGS. 3–5 which show a modification of the mechanical device for lifting of a receiver 6, a swinging frame 25 is horizontally pivoted to turn-down portions 22′ and 22″ (22″ is not shown) of sectorial shape with a stop at each corner of each end of the turn-down portions 22′ and 22″ forming the right and left sides of a switch case 22 which is to be inserted between supports 2 and 3 protruding from the head of a case 1 of a conventional desk set telephone, and a U-shaped swinging piece 26 is pivoted to the turn-down portions 22′ and 22″, the upright sides of the former 26 being bent around the ends of the latter 22′ and 22″.

The top flat portion 25′ of the swinging frame 25 is connected by means of a coiled spring 28 with the horizontal portion of the swinging piece 26, and a switch 27 is fixed to the upper part of one upright side of the swinging piece 26. Both ends of the swinging frame 25 are respectively connected by means of links 24 and 29 with the lower ends of a push-down cylinder 23 and a lifting cylinder 30 which pass vertically through the top flat portion of the switch case 22.

A lifter 31 with turn-up brims at the front and rear edges, on which a microtelephone or handset 6 is to be mounted, is fixed to the upper end of the lifting cylinder 30 and a knob 23′ is fitted to the upper end of the push-down cylinder 23.

A switch 34 is attached to the back of the left end of the lifter 31 which extends over a telephone switch-button 5 of a conventional desk set telephone, and a button 35 of the switch 34 and the telephone switch-button 5 are projected upward through an extending portion of the lifter 31.

One of the terminals 32 and 33, which are provided on proper portions of the switch case 22 and are able to come into contact with the T-shaped arms projecting from both sides of the switch 27 when the push-down cylinder 23 falls, is connected with one terminal of a switch 34, and the other terminal of the same switch 34 and the other of the above-mentioned terminals 32 and 33 are respectively connected with the terminals 49 and 50 shown in FIG. 8.

When the push-down cylinder 23 is pushed down by means of a knob 23′ so the rear end of the swinging frame 25 is lowered, the front end of the swinging frame 25 is raised and the lifting cylinder rises thereby raising the lifter 31 with the microtelephone or handset 6.

As the swinging frame 25 and the swinging piece 26 swing about their axes in opposite directions on account of being connected by a coiled spring 28, when the lifter 31 is raised, the switch 27 is switched on thereby setting an electrical device in action while the switch 34 is constantly switched on, the button 35 of the switch 34 being pressed down by the microtelephone or handset 6 mounted on the lifter 31.

When the lifter 31 is rather strongly pressed down the lifting cylinder 30 is lowered, thus lowering the front end of the swinging frame 25, the swinging piece 26 is swung oppositely to the swinging frame 25 so as to switch off the switch 27 thereby stopping the action of the electrical device.

Figure 6:
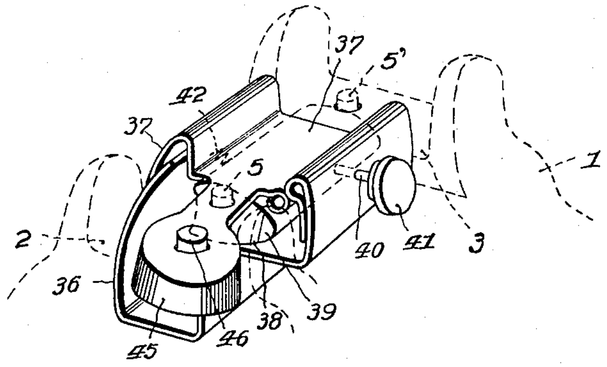
FIG. 6 is a perspective view of another modification of the mechanical device.
Figure 7:
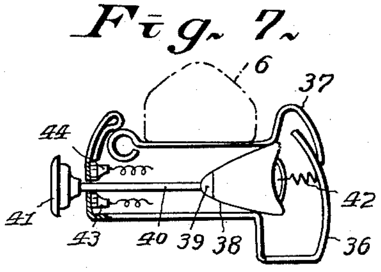
FIG. 7 is a side view partly in section of the same modification.

Referring to FIGS. 6 and 7, which show another modification of the mechanical device for lifting of a receiver 6, a lifter 37 with a protuberant brim at the rear, on which a receiver (microtelephone or handset) 6 is to be mounted, is fitted in over a top-open elastic shell 36 of an inverted L-shape, with and enlarged portion at the rear and a prolonged turn-up brim at the front, which is to be inserted between supports 2 and 3 protruding from the head of a case 1 of a conventional desk set telephone.

A stem 40 with a conical reciprocator 38 of an electrically nonconductive material at the rear end and a knob 41 at the front end, loosely passes horizontally through the front side portion of the elastic shell 36, with the rear side portion of which the base of the reciprocator 38 is connected by means of a coiled spring 42. To the head of the reciprocator 38 is attached an electrically conductive piece 39 which acts as a part of a switch and with which co-operate two terminals 43 and 44, being insulated from parts retaining them, fixed to the inner surface of the front side portion around an aperture through which the stem 40 passes.

A switch 45 is attached to the back of the left end of the lifter 37 which extends over a telephone switch-button 5 of a conventional desk set telephone, and a button 46 of the switch 45 and a telephone switch-button 5 are projected upward through an extending portion of the lifter 37.

One of the terminals 43 and 44 is connected with one terminal of the switch 45, while the other of the terminals 43 and 44 and the other terminal of the switch 45 are respectively connected with the terminals 49 and 50 shown in FIG. 8.

When the larger portion of the reciprocator 38 is contained in the enlarged rear portion of the elastic shell 36, the mechanical device is not in action and consequently the electrical device is inactive.

When the larger portion of the reciprocator 38 is pulled by means of the stem 40 with the knob 41 and is caused to glide forward so as to raise the lifter 37, all the switches in the telephone and apparatus are instantly switched on thereby actuating both mechanical and electrical devices.

The electrical device shown in FIG. 8 is an embodiment of the invention, which corresponds to a type using batteries, but any other type can be adopted.

The invention is applicable to a wall telephone, a public telephone or any other telephone.

It will be understood that changes and modifications may be made without departing from the spirit and scope of the invention.

What I claim as my invention is:

1. A dial telephone subset having a case, a receiver, support means on said case for supporting said receiver, first switch means on said case actuated on movement of said receiver to connect said telephone to a telephone line, a lifter for said receiver having a member positioned under said receiver for lifting said receiver to actuate said first switch means, means for holding said member and said receiver in a lifted position, amplifying means associated with said receiver to amplify sounds generated by said receiver, a speaker connected to said amplifier for reproducing the amplified sounds, second switch means actuated on movement of said lifter to energize said amplifying means, and third switch means operated subsequent to operation of said second switch means on movement of said receiver away from said member for de-energizing said amplifying means.

2. A dial telephone as claimed in claim 1 wherein said switch means are adapted to be returned to their non-actuated condition on return of said receiver to said support means.

3. A dial telephone subset having a case, a receiver, support means on said case for supporting said receiver, first switch means on said case operated on movement of said receiver to connect said telephone to a telephone line, lifting means for said receiver, said lifting means having a part positioned under said receiver for vertical movement relative to said case, and an operating handle pivoted to said case and engageable with said part for lifting said part and said receiver above said support, amplifying means associated with said receiver to amplify signals received by said telephone, second switch means actuated on movement of said operating handle to energize said amplifying means, and third switch means operated subsequent to operation of said second switch means on movement of said receiver away from said lifter part for deenergizing said amplifying means.

4. In combination, a telephone subset having a case, a receiver, spaced support means on said case for supporting said receiver, first switch means on said case operated upon movement of said receiver to connect said telephone to a telephone line, amplifying means associated with said telephone for amplifying signals received by said receiver, a receiver lifter comprising a movable part positioned under said receiver, a conical reciprocator passing between said case and said movable part, a movable stem attached to said reciprocator for moving said conical reciprocator relative to said movable part to lift said movable part and said receiver above said case and close said first switch means to connect said telephone to a telephone line, and second switch means having a contact closing element on said conical reciprocator engageable with fixed contact elements on said case for energizing said amplifying means when said telephone is connected to a telephone line.

5. A dial telephone subset having a case, a receiver, spaced support means on said case for supporting said receiver, first switch means on said case operated upon movement of said receiver to connect said telephone to a telephone line, amplifying means associated with said telephone for amplifying signals received by said telephone, a lifter for said telephone receiver comprising a movable part positioned under said receiver and overlying one of said spaced supports, a conical reciprocator passing between said case and said movable part transversely thereof, a manually movable stem attached to said reciprocator for moving said conical reciprocator transversely of said movable part to lift said movable part and said receiver above said case and actuate said first switch means, second switch means having a contact closing element on said conical reciprocator engageable with fixed contact elements on said case for energizing said amplifying means when said telephone is connected to a telephone line, and third switch means on said movable part for de-energizing said amplifying means when said receiver has been removed from said lifter part.

6. In combination, a telephone subset having a case, a receiver, support means on said case for supporting said receiver, first switch means on said support means operated on movement of said receiver to connect said telephone to a telephone line, amplifying means associated with said telephone for amplifying signals received by said telephone, a lifter for said receiver comprising a movable member positioned under said receiver, a pair of oppositely moving cylinders, one of said cylinders positioned under said movable member and the other of said cylinders positioned adjacent to said member, a toggle mechanism for co-ordinating movement of said cylinders so that said movement of one cylinder in one direction causes movement of the other cylinder in an opposite direction, and second switch means actuated by said toggle mechanism for energizing said amplifying means when said telephone is connected to a telephone line.

7. In combination, a dial telephone subset having a case, a receiver, support means on said case for supporting said receiver, first switch means on said support means operated on movement of said receiver to connect said telephone to a telephone line, amplifying means associated with said receiver for amplifying signals received by said receiver, a lifter for said receiver comprising a movable member positioned under said receiver, a pair of oppositely moving cylinders, one of said cylinders positioned under said movable member and the other of said cylinders being positioned adjacent to said moveable member, a toggle mechanism for co-ordinating movement of said cylinders so that movement of one cylinder in one direction causes movement of the other cylinder in an opposite direction, second switch means actuated by said toggle mechanism for energizing said amplifying means when said telephone is connected to a telephone line, and third switch means, operated subsequent to operation of said second switch means by manual movement of said receiver away from said case, for de-energizing said amplifying means.

8. The combination as defined in claim 7 wherein said toggle mechanism is spring biased so that said toggle mechanism operates with a snap-action.

References Cited in the file of this patent

UNITED STATES PATENTS

| | | |
|---|---|---|
| 1,630,536 | Maurer | May 31, 1927 |
| 2,402,341 | Patterson | June 18, 1946 |
| 2,657,265 | Branson et al. | Oct. 27, 1953 |

FOREIGN PATENTS

| | | |
|---|---|---|
| 458,852 | Italy | Aug. 4, 1950 |
| 1,029,226 | France | Mar. 4, 1953 |